US011558862B2

(12) United States Patent
Huang et al.

(10) Patent No.: US 11,558,862 B2
(45) Date of Patent: Jan. 17, 2023

(54) CODEPOINT SCRAMBLING FOR A NON-COHERENT TRANSMISSION

(71) Applicant: QUALCOMM Incorporated, San Diego, CA (US)

(72) Inventors: Yi Huang, San Diego, CA (US); Wei Yang, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 17/073,174

(22) Filed: Oct. 16, 2020

(65) Prior Publication Data

US 2021/0337533 A1   Oct. 28, 2021

Related U.S. Application Data

(60) Provisional application No. 63/015,374, filed on Apr. 24, 2020.

(51) Int. Cl.
*H04W 72/04*    (2009.01)
*H04L 27/26*    (2006.01)
*H04L 25/03*    (2006.01)

(52) U.S. Cl.
CPC ... *H04W 72/0413* (2013.01); *H04L 25/03866* (2013.01); *H04L 27/2601* (2013.01)

(58) Field of Classification Search
CPC ... H04L 5/0055; H04L 5/0023; H04L 5/0053; H04L 1/1854; H04L 1/0027; H04L 5/001; H04L 1/0042; H04L 27/2601; H04L 27/2634; H04L 25/03866; H04W 72/0413; H04W 72/02

See application file for complete search history.

(56) References Cited

U.S. PATENT DOCUMENTS

| | | | | |
|---|---|---|---|---|
| 10,952,231 | B2* | 3/2021 | Liou | H04W 72/046 |
| 2011/0235599 | A1* | 9/2011 | Nam | H04W 72/0413 |
| | | | | 370/329 |
| 2011/0243066 | A1* | 10/2011 | Nayeb Nazar | H04L 5/0016 |
| | | | | 370/328 |
| 2013/0083748 | A1* | 4/2013 | Li | H04L 5/1469 |
| | | | | 370/329 |
| 2013/0322398 | A1* | 12/2013 | Jang | H04L 5/0057 |
| | | | | 370/329 |
| 2017/0245262 | A1* | 8/2017 | Nayeb Nazar | H04L 5/0016 |
| 2018/0006791 | A1* | 1/2018 | Marinier | H04L 1/0073 |
| 2019/0281588 | A1* | 9/2019 | Zhang | H04L 5/0051 |
| 2020/0305203 | A1* | 9/2020 | Liu | H04W 74/0866 |
| 2020/0314815 | A1* | 10/2020 | Kim | H04L 1/1671 |
| 2022/0007304 | A1* | 1/2022 | Haghighat | H04W 52/34 |

* cited by examiner

*Primary Examiner* — Yee F Lam
(74) *Attorney, Agent, or Firm* — Qualcomm Incorporated

(57) ABSTRACT

A method of wireless communication includes selecting, by a user equipment (UE), a first codepoint from a codebook based on control information to be transmitted to a base station. The codebook is associated with non-coherent transmissions from the UE to the base station. The method further includes generating, based on the first codepoint and a scrambling sequence that is associated with the UE, a second codepoint representing the control information. The method further includes transmitting the second codepoint by the UE to the base station.

28 Claims, 12 Drawing Sheets

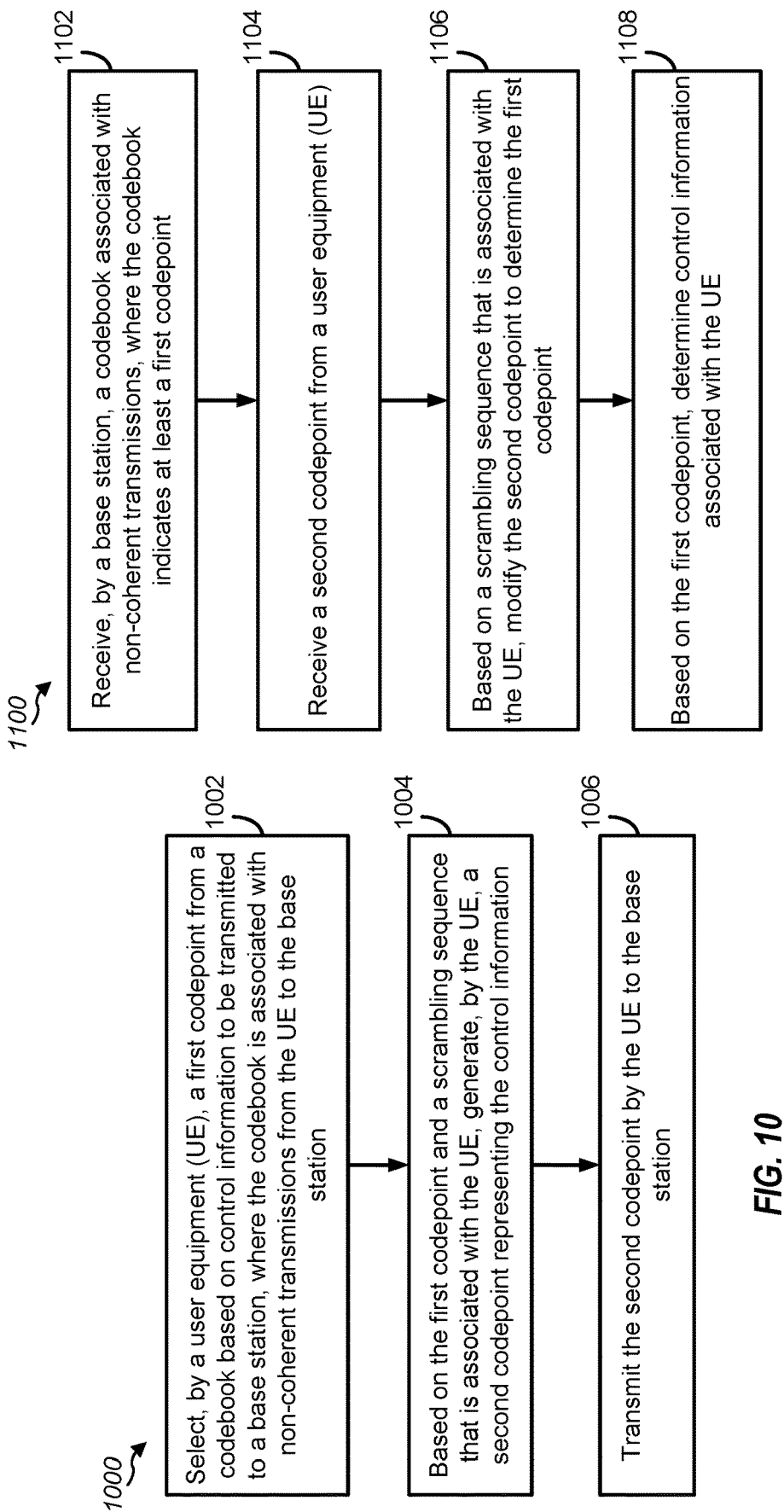

CODEPOINT SCRAMBLING FOR A NON-COHERENT TRANSMISSION

CROSS-REFERENCE TO RELATED APPLICATIONS

This application claims priority to and the benefit of U.S. Prov. Pat. App. No. 63/015,374, entitled "CODEPOINT SCRAMBLING FOR A NON-COHERENT TRANSMISSION" and filed on Apr. 24, 2020, which is expressly incorporated by reference herein in its entirety.

TECHNICAL FIELD

Aspects of the present disclosure relate generally to wireless communication systems, and more particularly, to wireless communication systems that perform non-coherent transmissions.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, a method of wireless communication includes selecting, by a user equipment (UE), a first codepoint from a codebook based on control information to be transmitted to a base station. The codebook is associated with non-coherent transmissions from the UE to the base station. The method further includes generating, based on the first codepoint and a scrambling sequence that is associated with the UE, a second codepoint representing the control information. The method further includes transmitting the second codepoint by the UE to the base station.

In some other aspects of the disclosure, an apparatus includes a memory and one or more processors coupled to the memory. The one or more processors are configured to select, by a UE, a first codepoint from a codebook based on control information to be transmitted to a base station. The codebook is associated with non-coherent transmissions from the UE to the base station. The one or more processors are further configured to generate, by the UE and based on the first codepoint and a scrambling sequence that is associated with the UE, a second codepoint representing the control information. The one or more processors are further configured to transmit the second codepoint by the UE to the base station.

In some other aspects of the disclosure, an apparatus includes means for storing instructions. The apparatus further includes means for executing the instructions to select, by a UE, a first codepoint from a codebook based on control information to be transmitted to a base station, to generate, based on the first codepoint and a scrambling sequence that is associated with the UE, a second codepoint representing the control information, and to transmit the second codepoint by the UE to the base station. The codebook is associated with non-coherent transmissions from the UE to the base station.

In some other aspects of the disclosure, a non-transitory computer-readable medium stores instructions executable by a processor to initiate, perform, or control operations. The operations include selecting, by a UE, a first codepoint from a codebook based on control information to be transmitted to a base station. The codebook is associated with non-coherent transmissions from the UE to the base station. The operations further include generating, based on the first codepoint and a scrambling sequence that is associated with the UE, a second codepoint representing the control information. The operations further include transmitting the second codepoint by the UE to the base station.

In some other aspects of the disclosure, a method of wireless communication includes receiving, by a base station, a codebook associated with non-coherent transmissions. The codebook indicates at least a first codepoint. The method further includes receiving a second codepoint from a UE. The method further includes modifying the second codepoint based on a scrambling sequence that is associated with the UE to determine the first codepoint and, based on the first codepoint, determining control information associated with the UE.

In some other aspects of the disclosure, an apparatus includes a memory and one or more processors coupled to the memory. The one or more processors are configured to receive, at a base station, a codebook associated with non-coherent transmissions. The codebook indicates at least a first codepoint. The one or more processors are further configured to receive a second codepoint from a UE. The one or more processors are further configured to modify the second codepoint to determine the first codepoint based on a scrambling sequence that is associated with the UE. The one or more processors are further configured to determine control information associated with the UE based on the first codepoint.

In some other aspects of the disclosure, an apparatus includes means for storing instructions. The apparatus further includes means for executing the instructions to receive, at a base station, a codebook associated with non-coherent transmissions and that indicates at least a first codepoint, to receive a second codepoint from a UE, to modify the second codepoint based on a scrambling sequence that is associated with the UE to determine the first codepoint, and to determine control information associated with the UE based on the first codepoint.

In some other aspects of the disclosure, a non-transitory computer-readable medium stores instructions executable by a processor to initiate, perform, or control operations. The operations include receiving, by a base station, a codebook associated with non-coherent transmissions. The codebook indicates at least a first codepoint. The operations further include receiving a second codepoint from a UE and, based on a scrambling sequence that is associated with the UE, modifying the second codepoint to determine the first codepoint. The operations further include determining control information associated with the UE based on the first codepoint.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 10 is a flow chart of an example of a method of wireless communication that may be performed by a UE according to some aspects of the disclosure.

FIG. 11 is a flow chart of an example of a method of wireless communication that may be performed by a base station according to some aspects of the disclosure.

DETAILED DESCRIPTION

Figure 1:
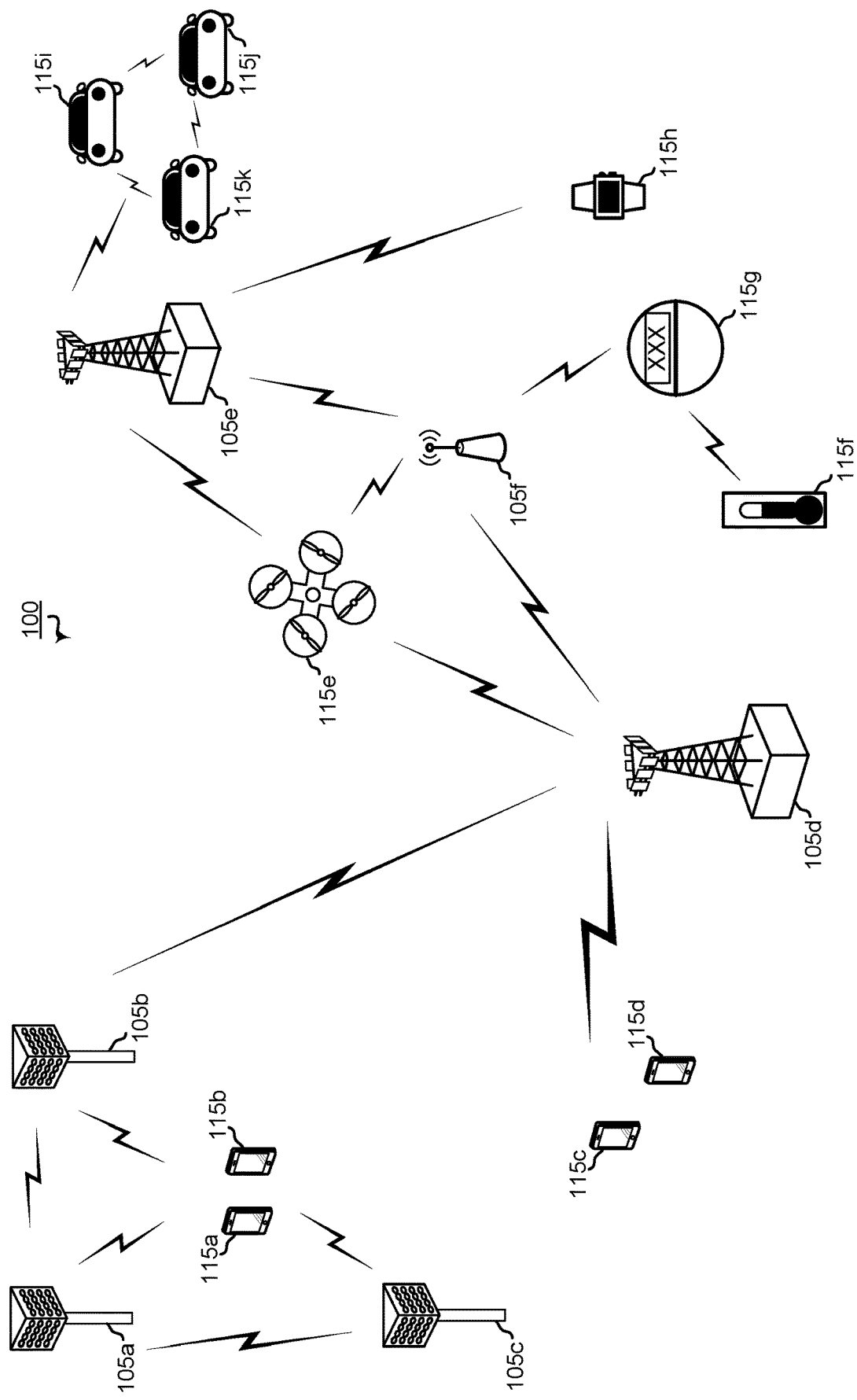
FIG. 1 is a block diagram illustrating an example of a wireless communication system to perform codepoint scrambling for a non-coherent transmission according to some aspects of the disclosure.

Wireless signals sent within a wireless communication system may be subject to noise, interference, and other conditions that reduce signal quality. To compensate for effects of noise, interference, and other conditions, some wireless communication systems use reference signals to estimate and then reduce or cancel the effects. For example, a user equipment (UE) may send a demodulation reference signal (DMRS) to a base station, and the base station may use the DMRS to estimate and compensate for effects of noise, interference, and other conditions on other signals sent by the UE to the base station. Transmission of signals using the DMRS may be referred to as a coherent transmission technique.

In some cases, DMRS-based communications may be less efficient than another technique, such as a non-coherent transmission technique. For example, in some circumstances, use of a DMRS may provide a poor estimate of the effects of noise, interference, and other conditions, such as in cases where a signal-to-noise ratio (SNR) is relatively low. In this case, a non-coherent transmission technique may be used. In an example of a non-coherent transmission, a UE may avoid sending a DMRS to a base station, and the base station may receive signals from the UE without using a DMRS. In some circumstances (such as in low SNR conditions), a non-coherent transmission may reduce power consumption. However, in some cases, quality of the non-coherent transmission may be reduced due to noise, interference, and other conditions.

A wireless communication system in accordance with some aspects of the disclosure uses scrambling specific to a UE for a non-coherent transmission to reduce correlation between signals transmitted by the UE and one or more other UEs. As a result, interference (such as inter-cell interference) between signals transmitted by the UEs may be reduced. For example, the UEs may use a codebook associated with non-coherent transmissions. To transmit control information to base stations, the UEs may select codepoints from the codebook that represent the control information. By scrambling the codepoints using UE-specific scrambling sequences, a probability of the UEs transmitting a same codepoint (or similar codepoints) is reduced, thus reducing correlation (and interference) associated with signals transmitted by the UEs. In some implementations, the reduced interference may increase a probability of successfully receiving and decoding signals transmitted by the UEs. Accordingly, a wireless communication system may realize power savings associated with non-coherent transmissions (e.g., by avoiding transmission of a DMRS) while also increasing signal quality (e.g., by reducing correlation and interference associated with signals transmitted by UEs).

To further illustrate, aspects of the disclosure may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, uses may come about via integrated chip implementations and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some implementations. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile device is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" device or UE need not necessarily have a capability to move, and may be stationary. Some non-limiting examples of a mobile device include a mobile phone, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile device may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the example illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile device, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 may support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
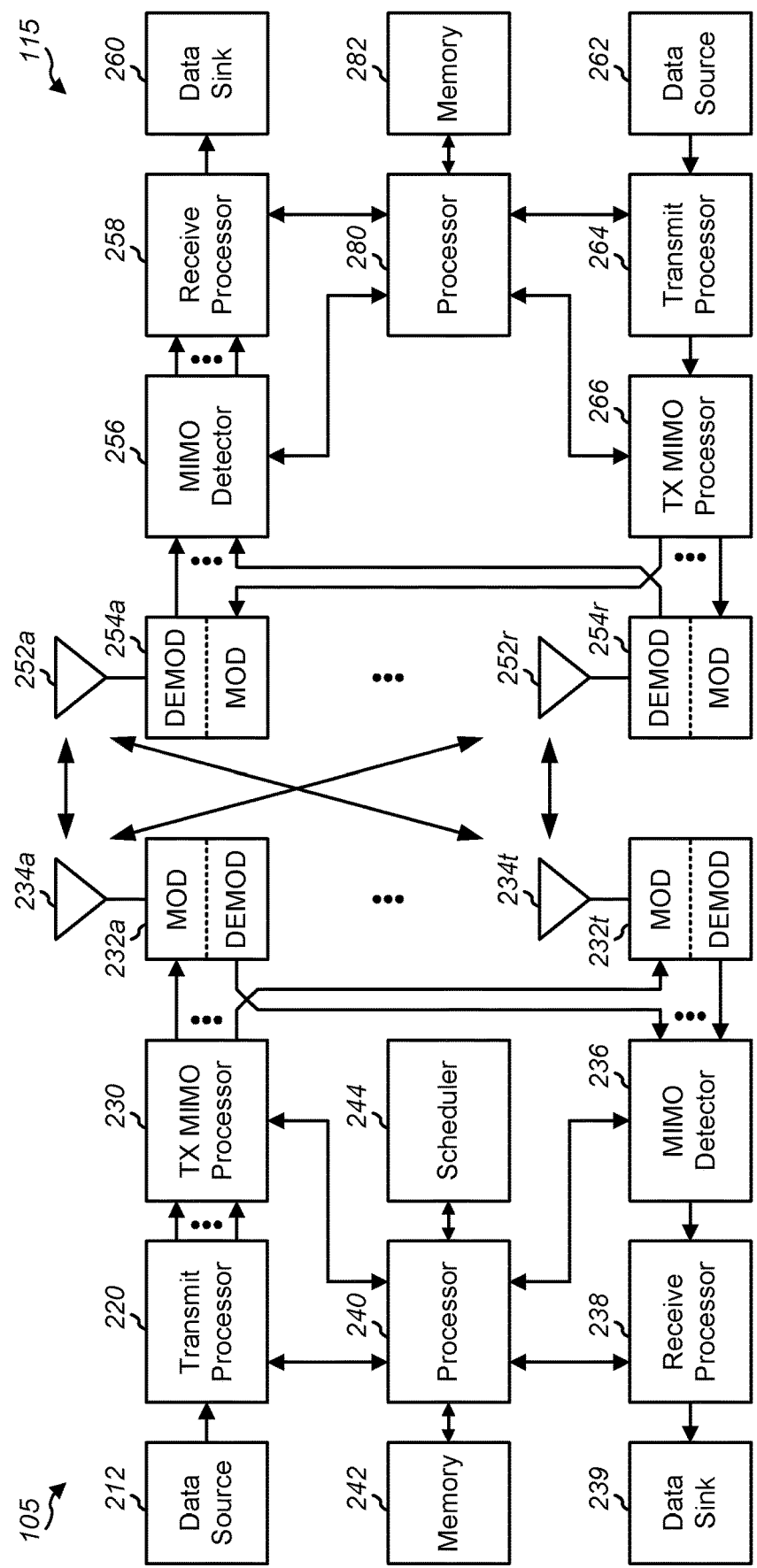
FIG. 2 is a block diagram illustrating examples of a base station and a UE to perform codepoint scrambling for a non-coherent transmission according to some aspects of the disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to processor 280.

On the uplink, at UE 115, transmit processor 264 may receive and process data (e.g., for the physical uplink shared channel (PUSCH)) from data source 262 and control information (e.g., for the physical uplink control channel (PUCCH)) from processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to processor 240.

Processors 240 and 280 may direct the operation at base station 105 and UE 115, respectively. Processor 240 and/or other processors and modules at base station 105 and/or processor 280 and/or other processors and modules at UE 115 may perform or direct the execution of various processes for the techniques described herein, such as to perform or direct the operations illustrated in FIGS. 10 and 11, one or more other operations, or a combination thereof. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
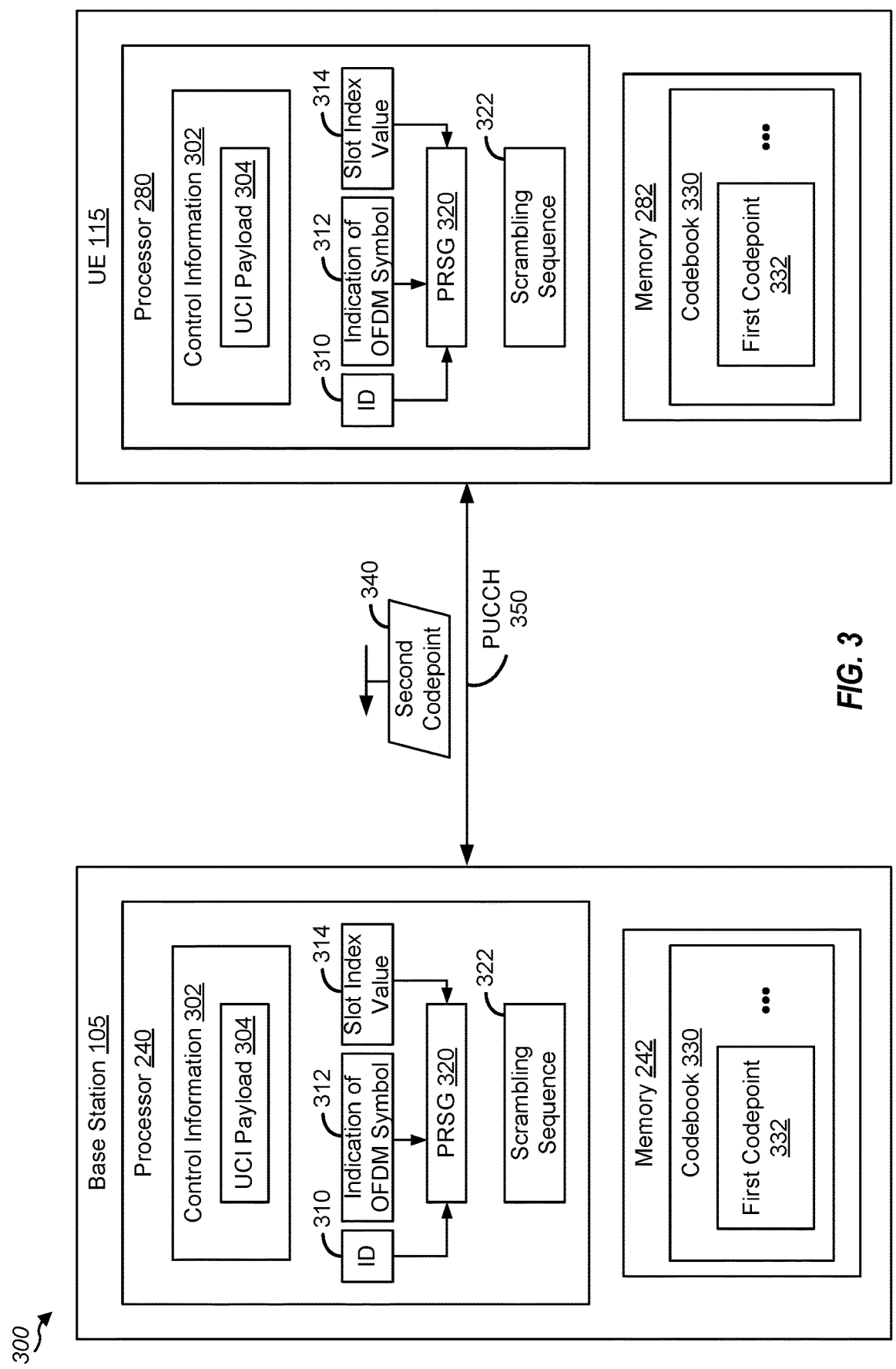
FIG. 3 is a block diagram illustrating another example of a wireless communication system to perform codepoint scrambling for a non-coherent transmission according to some aspects of the disclosure.

FIG. 3 illustrates another example of a wireless communication system 300 to scramble a codepoint associated with a non-coherent transmission. The wireless communication system 300 includes one or more base stations (such as the base station 105) and further includes one or more UEs, such as the UE 115.

During operation, the UE 115 is configured to perform non-coherent transmissions of control information 302 to the base station 105. As used herein, a non-coherent transmission may be performed without use of a demodulation reference signal (DMRS). The UE 115 may be configured to send the control information 302 to the base station 105 via a physical uplink control channel (PUCCH) 350. In some examples, the control information 302 includes or corresponds to an uplink control information (UCI) payload 304.

In some implementations, the UE 115 is configured to encode the control information 302 using a codebook 330 that is associated with non-coherent transmissions. The codebook 330 may include multiple codepoints, such as a first codepoint 332 and one or more other codepoints. The codepoints of the codebook 330 may be orthogonal, such as where the first codepoint 332 is orthogonal to each of the other codepoints of the codebook 330. The UE 115 may select one or more codepoints from the codebook 330 based on the control information 302 and may transmit the one or more codepoints to the base station 105. To further illustrate, the UE 115 may select a particular codepoint (e.g., the first codepoint 332, or another codepoint) from the codebook 330 based on bits of the control information 302 and may transmit the particular codepoint to the base station 105 via the PUCCH 350.

The base station 105 may receive a representation of the particular codepoint that may differ from the particular codepoint due to noise, interference, or other conditions. The base station 105 may use the codebook 330 to decode the representation of the particular codepoint to generate the control information 302. For example, the base station 105 may perform a vector correlation operation to identify one or more codepoints (e.g., a sequence of one or more codepoints, referred to as a codepoint sequence) in the codebook 330 having greater correlation to the representation of the particular codepoint as compared to one or more other codepoints (e.g., one or more other codepoint sequences) of the codebook 330. Based on the identified one or more codepoints (e.g., the identified codepoint sequence), the base station 105 may determine, from the codebook 330, the control information 302 or one or more bits of the control information 302. In some examples, the base station 105 may use the control information 302 to perform one or more operations, such as to schedule communications with the UE 115, to decode data sent by the UE 115 to the base station 105, to perform one or more other operations, or a combination thereof.

In some aspects of the disclosure, the UE 115 is configured to a modify a codepoint of the codebook 330. Modifying a codepoint may also be referred to herein as scrambling a codepoint. As used herein, scrambling a codepoint may include modifying one or more values of the codepoint, such as based on a random technique, based on a pseudorandom technique, or based on a deterministic technique. In some examples, the UE 115 modifies a codepoint based on a scrambling sequence 322.

To illustrate, in one example, the UE 115 includes or executes a pseudorandom sequence generator (PRSG) 320. The PRSG 320 may generate the scrambling sequence 322. In some examples, the PRSG 320 determines the scrambling sequence 322 based on one or more input values, such as one or more of an identifier (ID) 310 of the UE 115, an indication 312 of a particular orthogonal OFDM symbol, or a slot index value 314. The ID 310 may include a cell radio network temporary identifier (C-RNTI) or a temporary C-RNTI (TC-RNTI), as illustrative examples. In some examples, the PRSG 320 determines the scrambling sequence 322 pseudorandomly based on the ID 310 of the UE 115 and further based on the indication 312 of a particular orthogonal OFDM symbol. In this case, the slot index value 314 may not be provided to the PRSG 320 to determine the scrambling sequence 322. Alternatively or in addition, the PRSG 320 may determine the scrambling sequence 322 using one or more other techniques.

Figure 4:
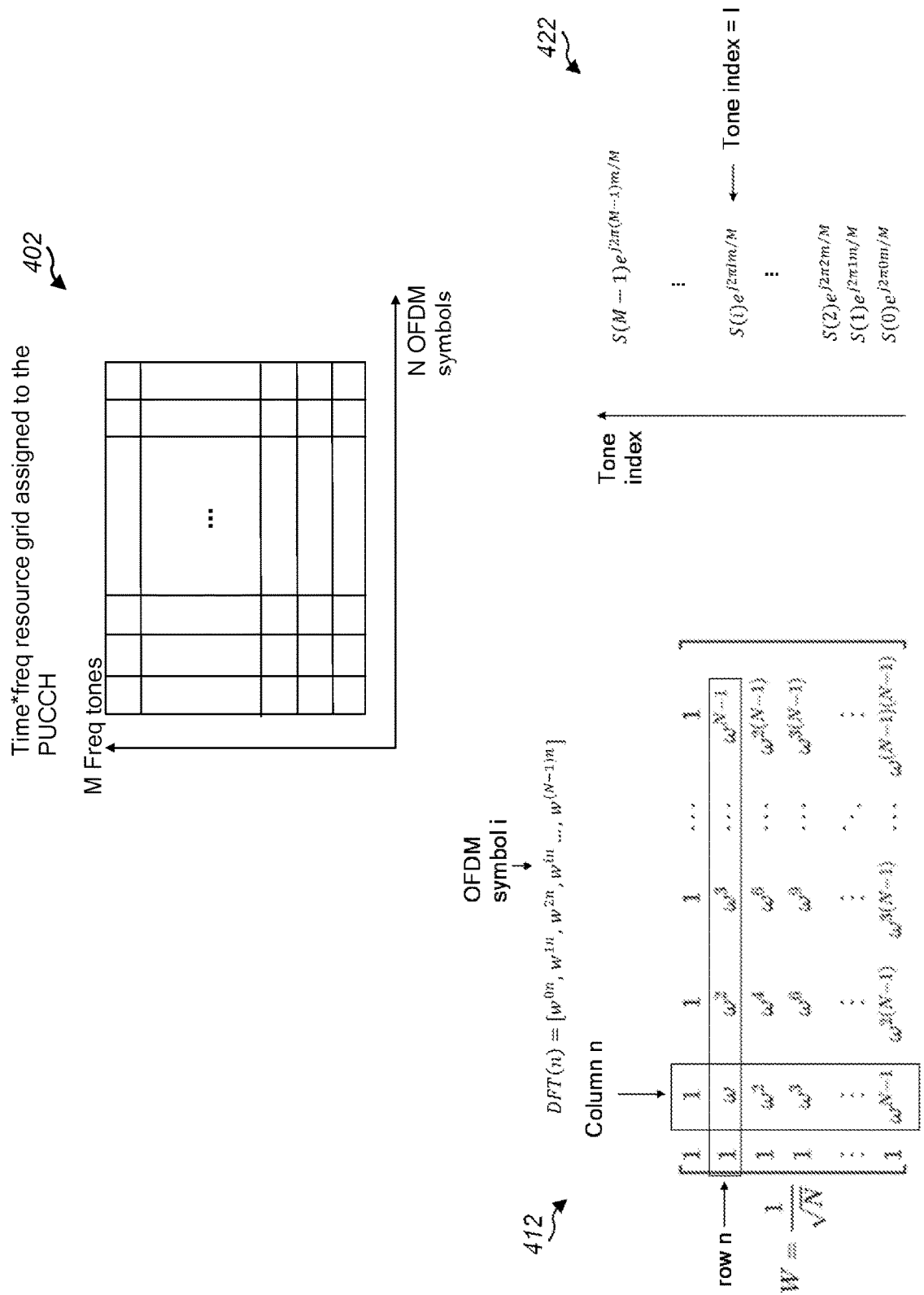
FIG. 4 is a diagram illustrating certain examples associated with a codebook that may be used in connection with codepoint scrambling for a non-coherent transmission according to some aspects of the disclosure.

To further illustrate, FIG. 4 is a diagram illustrating certain examples associated with the codebook 330 of FIG. 3. FIG. 4 depicts a resource grid 402 associated with the PUCCH. The resource grid includes M frequency tones and N OFDM symbols, where M and N are positive numbers. FIG. 4 also illustrates an example of a discrete Fourier transform (DFT) matrix 412 having N rows and N columns (also referred to herein as a DFT matrix of size N). In some examples, a DFT(n) corresponds to an (n)th row or column of the DFT matrix 412, where an (i)th value of the DFT(n) corresponds to an i(th) OFDM symbol of the N OFDM symbols of the resource grid 402 (where $0 \leq i \leq N-1$, and where $1 \leq n \leq N$). In some examples, 1 may be referred to as an OFDM symbol index of the N OFDM symbols of the resource grid 402.

FIG. 4 also illustrates M values 422 associated with a base sequence parameter S. Each value 422 is based on a value of the base sequence parameter S (e.g., S(0), S(1), S(2), . . . S(i), . . . S(M−1). A time domain cyclic shift (CS) m may be applied to each value of the base sequence parameter S, where each time domain CS m corresponds to a phase ramp having a slope $-j2\pi lm/M$ or $j2\pi lm/M$ (where $j=\mathrm{sqrt}(-1)$, where $0 \leq l \leq M-1$, and where $1 \leq m \leq M$). In some examples, 1 may be referred to as a tone index of the M frequency tones, of the resource grid 402.

Figure 5:
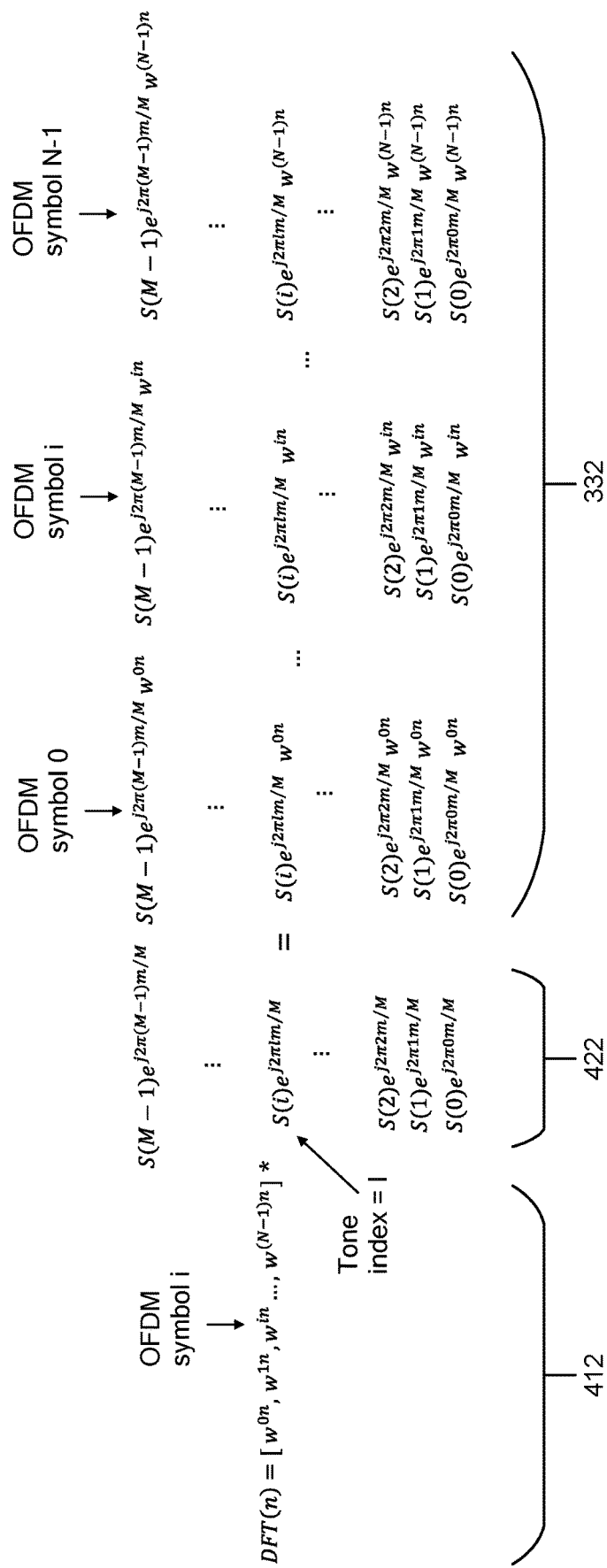
FIG. 5 is a diagram illustrating an example of generating a codepoint that may be used in connection with codepoint scrambling for a non-coherent transmission according to some aspects of the disclosure.

FIG. 5 is a diagram illustrating an example of generating a codepoint of the codebook 330, such as the first codepoint 332. The first codepoint 332 may be generated based on the DFT matrix 412 and the values 422 of the base sequence parameter S. For example, first codepoint 332 may be generated based on a Kronecker product of the DFT matrix 412 and the values 422.

Figure 6:
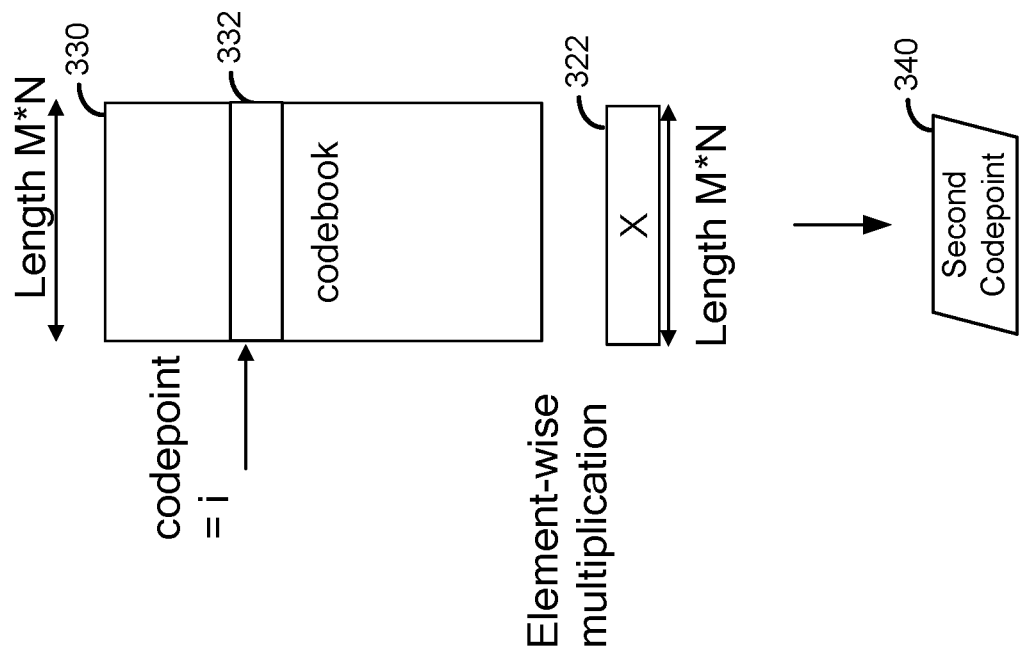
FIG. 6 is a block diagram depicting aspects of an illustrative example of scrambling a codepoint for a non-coherent transmission according to some aspects of the disclosure.

FIG. 6 is a block diagram depicting aspects of an illustrative example of scrambling a codepoint for a non-coherent transmission. In FIG. 6, the first codepoint 332 may be scrambled based on the scrambling sequence 322 to generate the second codepoint 340 based on a time domain and frequency domain scrambling technique.

In the example of FIG. 6, a length of the first codepoint 332 is based on a first number of values (e.g., N) of the DFT matrix 412 and further based on a second number of values (e.g., M) of the base sequence parameter S, and a length of the scrambling sequence 322 corresponds to the length of the first codepoint 332. For example, the first number may correspond to N, and the second number may correspond to M. A length of the first codepoint 332 may correspond to M*N, and a length of the scrambling sequence 322 may correspond to M*N. For example, the scrambling sequence 322 may include M*N values.

The example of scrambling in FIG. 6 may be referred to as an example of scrambling in both the time domain and in the frequency domain. For example, because the length of the scrambling sequence 322 corresponds to M*N, values of the scrambling sequence 322 may be applied to values of the first codepoint 332 associated with the N values of the DFT matrix 412 and also to values of the first codepoint 332 associated with the values 422 of the base sequence parameter S. The N values of the DFT matrix 412 may be associated with the time domain (e.g., the abscissa of the resource grid 402 of FIG. 4), and the values 422 of the base sequence parameter S may be associated with the frequency domain (e.g., the ordinate of the resource grid 402 of FIG. 4). Further, in FIG. 6, modifying the first codepoint 332 includes multiplying values of the first codepoint in both time and frequency domains. For example, values of the first codepoint 332 may be modified for different OFDM symbols (e.g., OFDM symbols 0, i, and N−1) to scramble in the time domain and also for different values of the base sequence parameter S (e.g., the values S(0), S(1), S(2), S(i), and S(M−1)) to scramble in the frequency domain. Thus, the example of scrambling in FIG. 6 may be referred to as scrambling in both the time domain and in the frequency domain.

Figure 7:
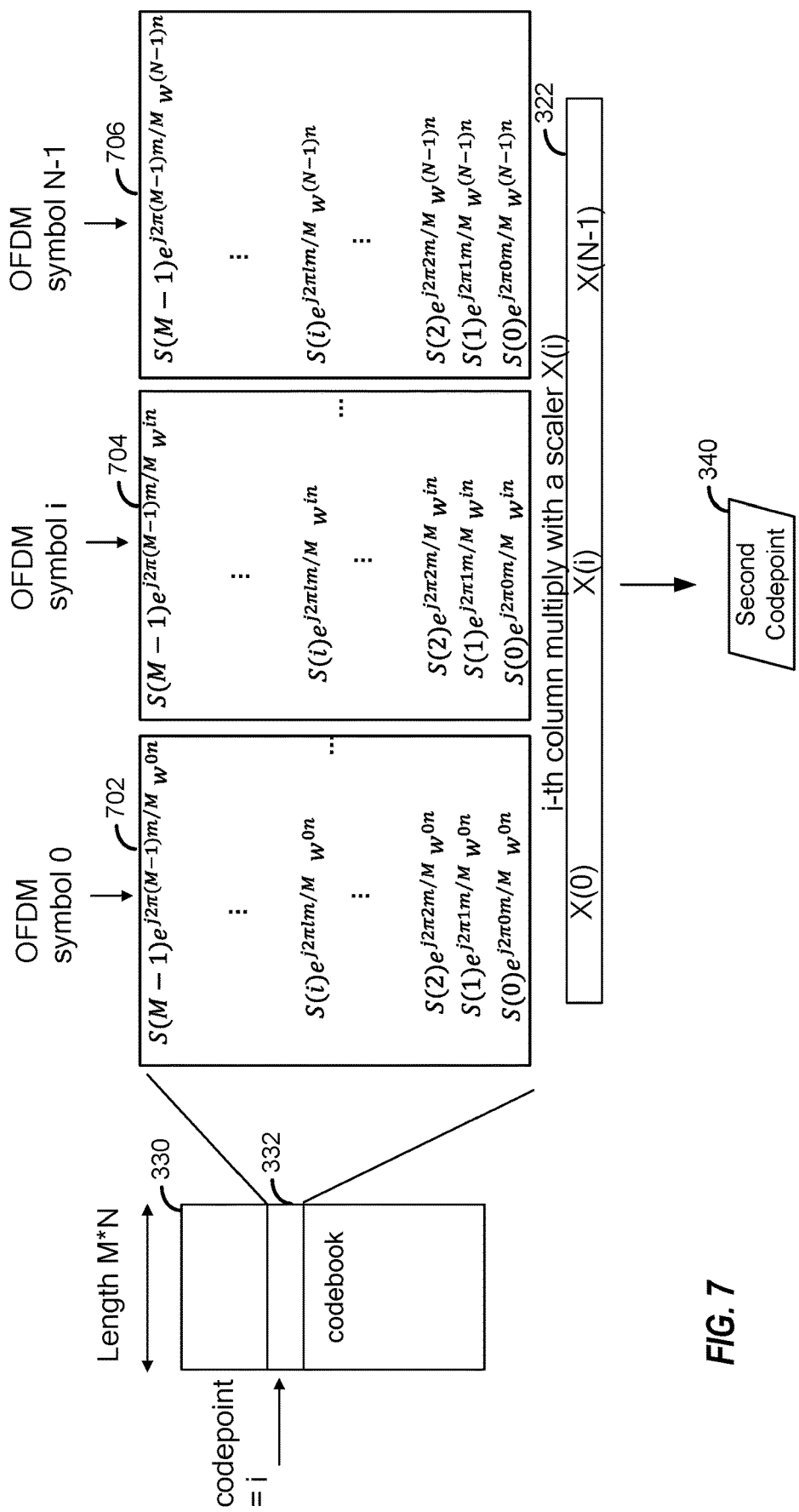
FIG. 7 is a block diagram depicting aspects of another illustrative example of scrambling a codepoint for a non-coherent transmission according to some aspects of the disclosure.

FIG. 7 is a block diagram depicting aspects of another illustrative example of scrambling a codepoint for a non-coherent transmission. In FIG. 7, the first codepoint 332 may be scrambled based on the scrambling sequence 322 to generate the second codepoint 340.

In the example of FIG. 7, the first codepoint 332 is associated with a particular number (e.g., N) of OFDM symbols, and a length of the scrambling sequence 322 corresponds to the particular number. For example, the scrambling sequence 322 may include N values. In the example of FIG. 7, the N values of the scrambling sequence 322 may include X(0), X(i), and X(N−1) based on a time domain scrambling technique.

In the example of FIG. 7, the first codepoint 332 may include a plurality of values associated with a particular OFDM symbol. For example, the particular OFDM symbol may correspond to OFDM symbol 0, and the plurality of values may correspond to values 702 associated with OFDM symbol 0. As additional examples, the particular OFDM symbol may correspond to OFDM symbol i or OFDM symbol N−1, and the plurality of values may correspond to values 704 associated with OFDM symbol i or values 706 associated with OFDM symbol N−1, respectively.

In some examples, generating the second codepoint 340 includes multiplying the plurality of values with a particular element of the scrambling sequence corresponding to the plurality of values. For example, generating the second codepoint 340 may include multiplying the element X(0) with the values 702. As additional examples, generating the second codepoint 340 may include multiplying the element X(i) with the values 704 and may further include multiplying the element X(N−1) with the values 706.

The example of scrambling in FIG. 7 may be referred to as an example of scrambling in the time domain. For example, because the length of the scrambling sequence 322 corresponds to N, values of the scrambling sequence 322 may be applied to values of the first codepoint 332 associated with the N values of the DFT matrix 412. The N values of the DFT matrix 412 may be associated with the time domain (e.g., the abscissa of the resource grid 402 of FIG. 4). Thus, the example of scrambling in FIG. 7 may be referred to as scrambling in the time domain.

Figure 8:
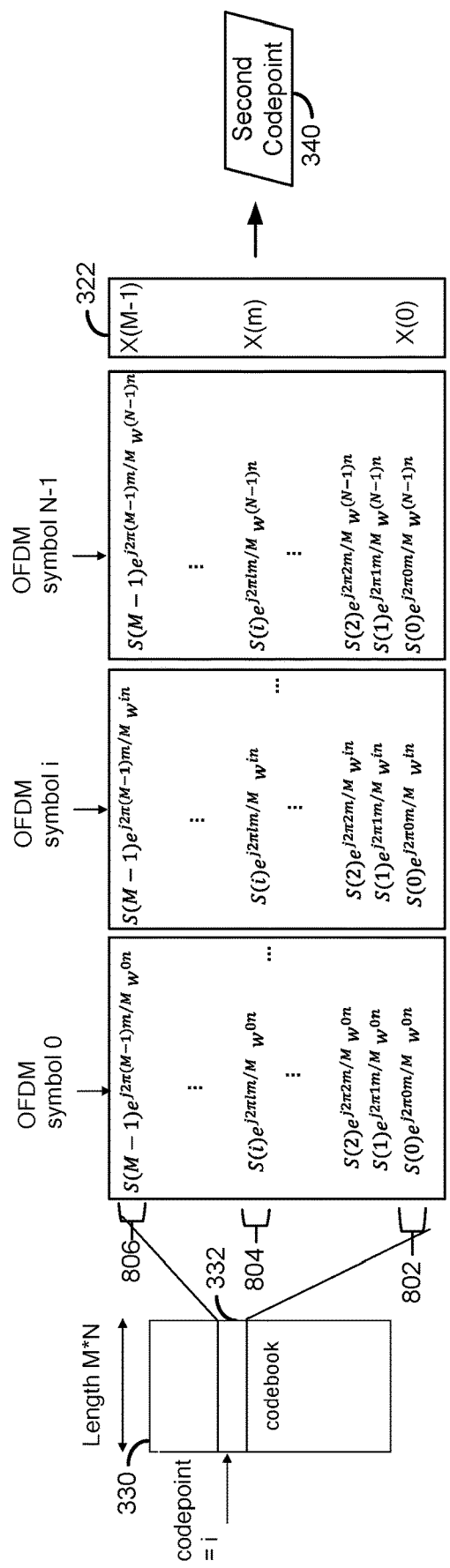
FIG. 8 is a block diagram depicting aspects of another illustrative example of scrambling a codepoint for a non-coherent transmission according to some aspects of the disclosure.

FIG. 8 is a block diagram depicting aspects of an illustrative example of scrambling a codepoint for a non-coherent transmission. In FIG. 8, the first codepoint 332 may be scrambled based on the scrambling sequence 322 to generate the second codepoint 340 based on a frequency domain scrambling technique.

In the example of FIG. 8, the first codepoint 332 is associated with a particular number (e.g., M) of values of the base sequence parameter S, and a length of the scrambling sequence 322 corresponds to the particular number. For example, the scrambling sequence 322 may include M values. In the example of FIG. 8, the M values of the scrambling sequence 322 may include X(0), X(m), and X(M−1).

In FIG. 8, the first codepoint 332 includes a plurality of values associated with a particular base sequence parameter S. For example, the first codepoint 332 includes values 802 associated with the base sequence parameter S(0). As additional examples, the first codepoint 332 includes values 804 associated with the base sequence parameter S(i) and further includes values 806 associated with the base sequence parameter S(M−1).

In the example of FIG. 8, generating the second codepoint 340 may include multiplying the plurality of values with a particular element of the scrambling sequence corresponding to the plurality of values. For example, generating the second codepoint 340 may include multiplying the element X(0) with the values 802. As additional examples, generating the second codepoint 340 may include multiplying the element X(m) with the values 804 and may further include multiplying the element X(M−1) with the values 806.

The example of scrambling in FIG. 8 may be referred to as an example of scrambling in the frequency domain. For example, because the length of the scrambling sequence 322 corresponds to M, values of the scrambling sequence 322 may be applied to values of the first codepoint 332 associated with the values 422 of the base sequence parameter S. The values 422 of the base sequence parameter S may be associated with the frequency domain (e.g., the ordinate of the resource grid 402 of FIG. 4). Thus, the example of scrambling in FIG. 8 may be referred to as scrambling in both the time domain and in the frequency domain.

Figure 9:
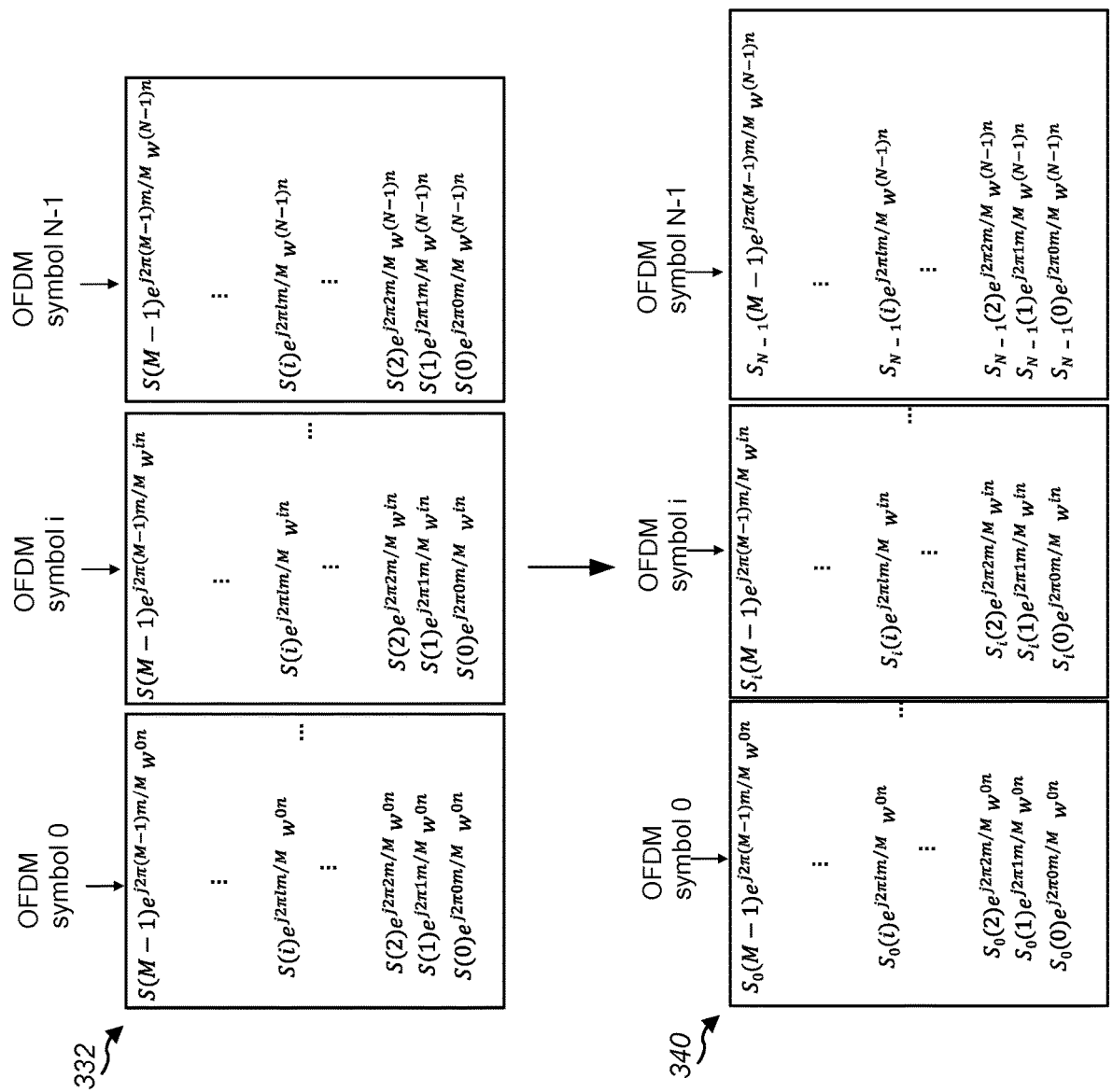
FIG. 9 is a block diagram depicting aspects of another illustrative example of scrambling a codepoint for a non-coherent transmission according to some aspects of the disclosure.

FIG. 9 is a block diagram depicting aspects of an illustrative example of scrambling a codepoint for a non-coherent transmission. In FIG. 9, the first codepoint 332 may be scrambled based on the scrambling sequence 322 to generate the second codepoint 340 using a base sequence parameter scrambling technique.

In some examples, the scrambling sequence 322 indicates, for a particular OFDM symbol associated with the first codepoint 332, a first modified base sequence parameter. As an example, for OFDM symbol 0, the first modified base sequence parameter may correspond to $S_0(0)$. As additional examples, for OFDM symbols i and N−1, the first modified base sequence parameter may correspond to $S_i(0)$ and $S_{N-1}(0)$, respectively.

In one example, each first modified base sequence parameter is randomly selected using the PRSG 320 from a pool of values of the base sequence parameter S. For example, in some implementations, the base station 105 and the UE 115 communicate using a wireless communication protocol that specifies the pool of values of the base sequence parameter S. In some examples, the pool of values has a size Z, where Z is a positive integer greater than one, such as 30 values, 60 values, or another number of values included in the pool of values.

Each first modified base sequence parameter of the second codepoint 340 may be different than a corresponding base sequence parameter of the first codepoint 332. For example, the modified first base sequence parameter $S_0(0)$ of OFDM symbol 0 of the second codepoint 340 may differ from the corresponding base sequence parameter S(0) of OFDM symbol 0 of the first codepoint 332. As another example, the modified first base sequence parameter $S_i(0)$ of OFDM symbol i of the second codepoint 340 may differ from the corresponding base sequence parameter S(0) of OFDM symbol i of the first codepoint 332. As an additional example, the modified first base sequence parameter $S_{N-1}(0)$ of OFDM symbol N−1 of the second codepoint 340 may differ from the corresponding base sequence parameter S(0) of OFDM symbol N−1 of the first codepoint 332.

The first modified base sequence parameters may be determined using one or more techniques. In one example, the PRSG 320 of FIG. 3 may generate, for each OFDM symbol of the first codepoint 332, a first modified base sequence parameter. For example, the PRSG 320 may generate each first modified base sequence parameter based on one or more of the ID 310 of the UE 115, the indication 312, or the slot index value 314, such as by using one or more of the ID 310 of the UE 115, the indication 312, or the slot index value 314 as seed values to determine each first modified base sequence parameter.

In some examples, each first modified base sequence parameter is incremented, based on a modulus corresponding to the size Z of the pool of values, to determine a second modified base sequence parameter. In one example, the second modified base sequence parameters may include values $S_0(1)$, $S_i(1)$, and $S_{N-1}(1)$. To further illustrate, if the pool of values includes 30 values, and if $S_0(0)=12$, then $S_0(1)=13$. As another example, if the pool of values includes 30 values, and if $S_i(0)=30$, then $S_i(1)=1$. Similarly, third modified base sequence parameters (e.g., $S_0(2)$, $S_i(2)$, and $S_{N-1}(2)$) of the second codepoint 340 may be generated by incrementing the second modified base sequence parameters, and so on.

The example of scrambling in FIG. 9 may be referred to as an example of scrambling using a base sequence parameter scrambling technique. For example, values of the base sequence parameter S in the first codepoint 332 may be modified to generate the second codepoint 340. Thus, the example of scrambling in FIG. 9 may be referred to as scrambling using a base sequence parameter scrambling technique.

Alternatively or in addition, the example of FIG. 9 may be referred to as frequency hopping on a per-OFDM symbol basis. For example, a first modified base sequence parameter may be selected independently for each OFDM symbol. Thus, modification of the base sequence parameter S may be performed on a per-OFDM symbol basis.

Referring again to FIG. 3, after generating the second codepoint 340, the UE 115 may transmit the second codepoint 340 to the base station 105. The UE 115 may transmit the second codepoint 340 without a DMRS. To further illustrate, in some examples, the UE 115 transmits the second codepoint 340 to the base station 105 via the PUCCH 350 using a non-coherent transmission that does not include a DMRS.

The base station 105 may receive the second codepoint 340 (or a representation of the second codepoint 340 that differs from the second codepoint 340 due to noise, interference, or one or more other conditions). The base station 105 may perform operations to determine the first codepoint 332 based on the received second codepoint 340. For example, if the UE 115 uses a particular operation described with reference to FIGS. 3-9 to modify the first codepoint 332 to generate the second codepoint 340, the base station 105 may perform an inverse of the operation to determine the first codepoint 332 based on the second codepoint 340. Determining the first codepoint 332 based on the second codepoint 340 may be referred to herein as descrambling the second codepoint 340.

In one example, the inverse operation corresponds to an inverse of one or more operations described with reference to FIG. 6. For example, the base station 105 may perform an elementwise division of the second codepoint 340 by the scrambling sequence 322 to determine the first codepoint 332.

In another example, the inverse operation corresponds to an inverse of one or more operations described with reference to FIG. 7. To illustrate, the second codepoint 340 include a plurality of values associated with a particular OFDM symbol, and modifying the first codepoint 332 may include dividing the plurality of values with a particular element of the scrambling sequence 322 corresponding to the plurality of values. In one example, the plurality of values includes a first set of products of the values 702 and the value X(0), and the particular OFDM symbol may correspond to OFDM symbol 0. The base station 105 may divide the first set of products by the value X(0) to determine the values 702. In another example, the plurality of values includes a second set of products of the values 704 and the value X(i), and the base station 105 may divide the second set by the value X(i) to determine the values 704. In another example, the plurality of values includes a third set of products of the values 706 and the value X(N−1), and the base station 105 may divide the third set by the value X(N−1) to determine the values 706.

In another example, the inverse operation corresponds to an inverse of one or more operations described with reference to FIG. 8. To illustrate, the second codepoint 340 may include a plurality of values associated with a particular base sequence parameter S, and modifying the second codepoint 340 may include dividing the plurality of values with a particular element of the scrambling sequence 322 corresponding to the plurality of values. In one example, the plurality of values includes a first set of products of the values 802 and the value X(0), and the particular base sequence parameter S may correspond to the value S(0). The base station 105 may divide the first set of products by the value X(0) to determine the values 802. In another example, the plurality of values includes a second set of products of the values 804 and the value X(m), and the base station 105 may divide the second set by the value X(m) to determine the values 804. In another example, the plurality of values includes a third set of products of the values 806 and the value X(M−1), and the base station 105 may divide the third set by the value X(M−1) to determine the values 806.

In another example, the inverse operation corresponds to an inverse of one or more operations described with reference to FIG. 9. For example, the base station 105 may determine, for each OFDM symbol of the second codepoint 340, a first modified base sequence parameter using one or more techniques described with reference to FIG. 9 and may adjust a value of the second codepoint 340 by the first modified base sequence parameter. To illustrate, the PRSG 320 of the base station 105 may generate, for each OFDM symbol of the second codepoint 340, a first modified base sequence parameter. For example, the PRSG 320 may generate each first modified base sequence parameter based on one or more of the ID 310 of the UE 115, the indication 312, or the slot index value 314, such as by using one or more of the ID 310 of the UE 115, the indication 312, or the slot index value 314 as seed values to determine each first modified base sequence parameter. It is noted that the PRSG 320 of the base station 105 may operate similarly to or the same as the PRSG 320 of the UE 115.

The base station 105 may adjust a value of each OFDM symbol based on a corresponding first modified base sequence parameter. For example, the base station 105 may determine a difference between a first modified base sequence parameter (e.g., $S_0(0)$) and a corresponding value (e.g., $S(0)$) and may adjust the second codepoint 340 based on the difference. Similarly, the base station 105 may increment each first modified base sequence parameter to determine a second modified base sequence parameter and may adjust the second codepoint 340 based on the difference. After adjustment of the values, the adjusted second codepoint 340 may correspond to the first codepoint 332.

After determining the first codepoint 332, the base station 105 may use the first codepoint 332 to determine the control information 302. For example, the codebook 330 may indicate mappings of bits to codepoints, and the base station 105 may use the codebook 330 to identify, based on the first codepoint 332, bits of the control information 302. The base station 105 may use the control information 302 to perform one or more operations, such as to schedule communications with the UE 115, to decode data sent by the UE 115 to the base station 105, to perform one or more other operations, or a combination thereof.

In some aspects, one or more operations described herein may be selectively performed based on a signal-to-noise ratio of one or more signals in the wireless communication system 300. For example, one or both of the base station 105 and the UE 115 may measure (or detect) an SNR. In response to the SNR failing to satisfy (e.g., being less than) a threshold SNR, a non-coherent transmission may be performed. In other cases, in response to the SNR satisfying (e.g., being greater than or equal to) the threshold SNR, a coherent transmission may be performed (e.g., by including a DMRS in the transmission).

In some aspects, a wireless communication protocol may specify one technique, such as the technique of FIG. 6, the technique of FIG. 7, the technique of FIG. 8, or the technique of FIG. 9. In another example, a wireless communication protocol may specify multiple techniques. For example, a wireless communication protocol may specify that a device may select from among the technique of FIG. 6, the technique of FIG. 7, the technique of FIG. 8, or the technique of FIG. 9. In one example, each base station 105 selects among the techniques. As a result, different base stations 105 may use different techniques, which may further decrease correlation of codepoints transmitted by UEs 115.

In some implementations, transmission of the second codepoint 340 reduces inter-cell interference between the UE 115 and a second UE associated with a second base station as compared to use of the same codepoint (e.g., the same first codepoint 332) or similar codepoints (e.g., the first codepoint 332 and a third codepoint having a correlation to the first codepoint 332 that satisfies a correlation threshold) by the UE 115 and the second UE. For example, because the scrambling sequence 322 is associated with (e.g., unique to) the UE 115, a probability of the UE 115 and the second UE transmitting the same scrambled codepoint may be relatively low. As a particular example, if the scrambling sequence 322 is based on the ID 310 of the UE 115, and if a second scrambling sequence used by the second UE is based on a second ID of the second UE, then a probability of the UE 115 and the second UE transmitting the same scrambled codepoint may be relatively low. As a result, correlation of signals between the UE 115 and the second UE is reduced, and inter-cell interference may be reduced accordingly.

FIG. 10 is a flow chart illustrating an example of a method 10000 of wireless communication that may be performed by a UE according to some aspects of the disclosure. In some examples, the method 1000 is performed by the UE 115.

The method 1000 includes selecting, by the UE, a first codepoint from a codebook based on control information to be transmitted to a base station, at 1002. The codebook is associated with non-coherent transmissions from the UE to the base station. For example, the UE 115 may select the first codepoint 332 from the codebook 330 based on the control information 302.

The method 1000 further includes generating, based on the first codepoint and a scrambling sequence that is associated with the UE, a second codepoint representing the control information, at 1004. For example, the UE 115 may generate the second codepoint 340 based on the first codepoint 332 and further based on the scrambling sequence 322.

The method 1000 further includes transmitting the second codepoint by the UE to the base station, at 1006. For example, the UE 115 may transmit the second codepoint 340 to the base station 105.

FIG. 11 is a flow chart illustrating an example of a method 1100 of wireless communication that may be performed by a base station according to some aspects of the disclosure. In some examples, the method 1100 is performed by the base station 105.

The method 1100 includes receiving, by the base station, a codebook associated with non-coherent transmissions, at 1102. The codebook indicates at least a first codepoint. For example, the base station 105 may receive the codebook 330, and the codebook 330 may indicate at least the first codepoint 332.

The method 1100 further includes receiving a second codepoint from a UE, at 1104. For example, the base station 105 may receive the second codepoint 340.

The method 1100 further includes modifying the second codepoint based on a scrambling sequence that is associated with the UE to determine the first codepoint, at 1106. For example, the base station 105 may modify the second codepoint 340 based on the scrambling sequence 322 to determine the first codepoint 332. In some examples, the UE 115 may provide an indication of the scrambling sequence 322 to the base station 105. In some other examples, the base station 105 may determine the scrambling sequence 322 using one or more operations that correspond to inverses of operations performed by the UE 115, such as inverses of one or more operations described with reference to FIGS. 6-9.

The method 1100 further includes determining control information associated with the UE based on the first codepoint, at 1108. For example, the base station 105 may determine the control information 302 based on the first codepoint 332 and the codebook 330. In some examples, the base station 105 uses the first codepoint 332 as a lookup to the codebook 330 to determine bits of the control information 302.

Figure 12:
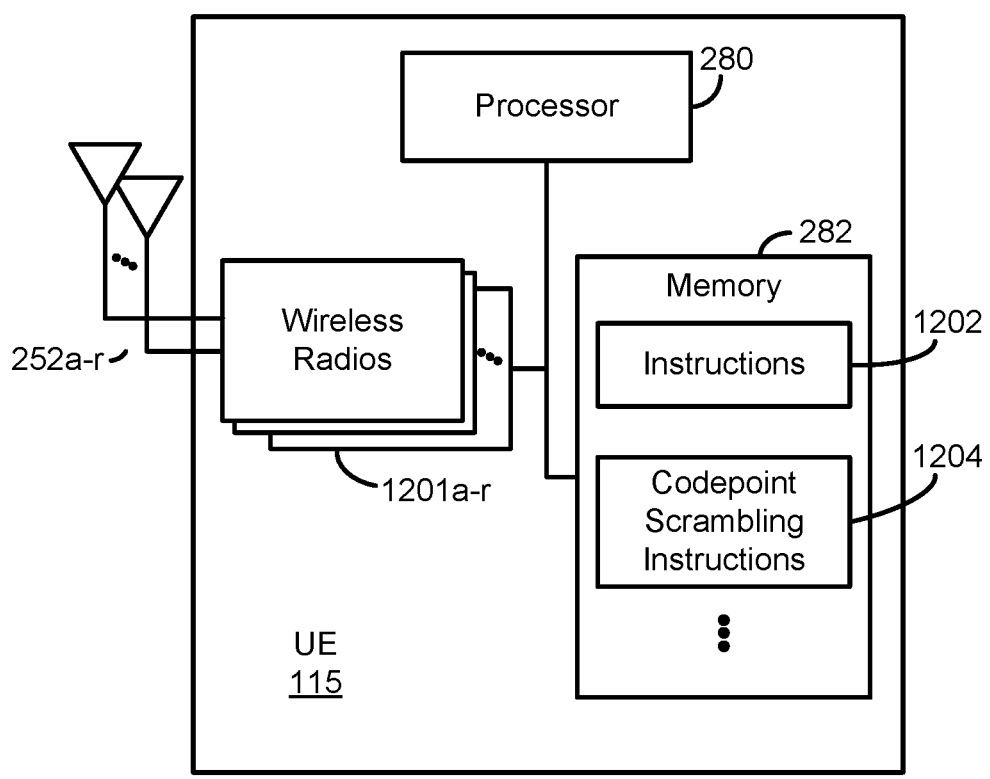
FIG. 12 is a block diagram illustrating an example of a UE to perform codepoint scrambling for a non-coherent transmission according to some aspects of the disclosure.

FIG. 12 is a block diagram illustrating an example of the UE 115 according to some aspects of the disclosure. The UE 115 may include the processor 280 and the memory 282. The processor 280 may execute instructions 1202 stored in the memory 282 to initiate, perform, or control one or more operations described herein. The processor 280 may execute the instructions 1202 to transmit and receive signals via wireless radios 1201a-r and the antennas 252a-r. The wireless radios 1201a-r may include hardware or other components corresponding to one or more features described with reference to FIG. 2, such as the modulator/demodulators 254a-r, the MIMO detector 256, the receive processor 258, the transmit processor 264, the TX MIMO processor 266, one or more other components, or a combination thereof. In some examples, the processor 280 executes scrambling instructions 1204 to scramble the first codepoint 332 to generate the second codepoint 340.

Figure 13:
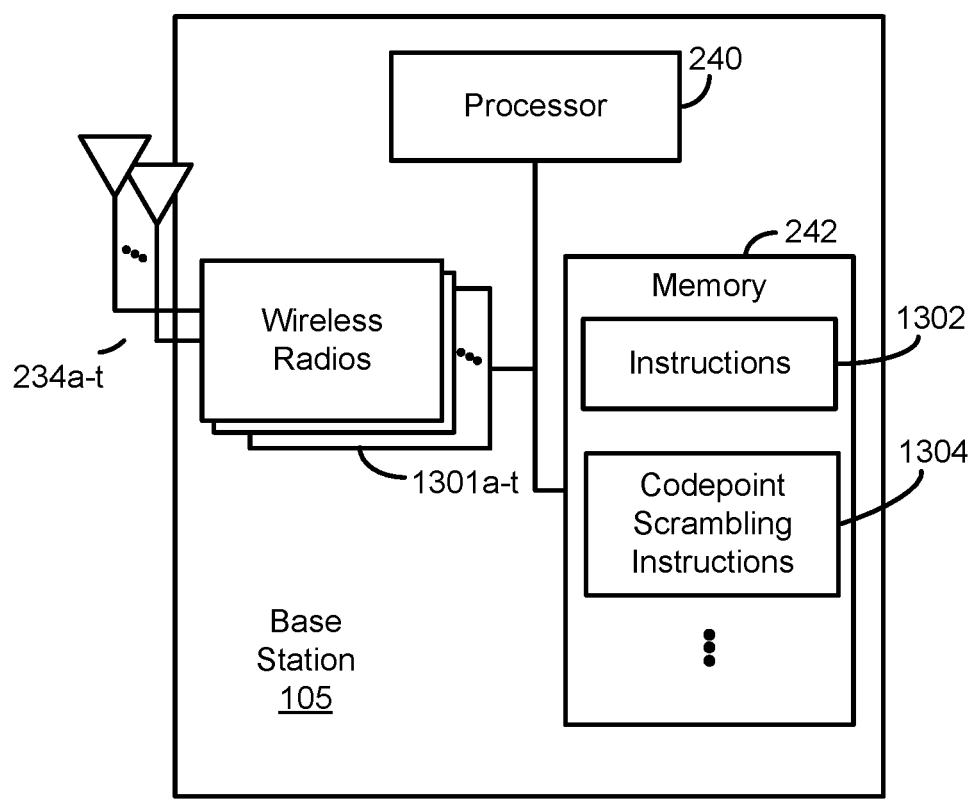
FIG. 13 is a block diagram illustrating an example of a base station to perform codepoint scrambling for a non-coherent transmission according to some aspects of the disclosure.

FIG. 13 is a block diagram illustrating an example of the base station 105 according to some aspects of the disclosure. The base station 105 may include the processor 240 and the memory 242. The processor 240 may execute instructions 1302 stored in the memory 242 to initiate, perform, or control one or more operations described herein. The processor 240 may execute the instructions 1302 to transmit and receive signals via wireless radios 1301a-t and the antennas 234a-t. The wireless radios 1301a-t may include hardware or other components corresponding to one or more features described with reference to FIG. 2, such as the modulator/demodulators 232a-t, the MIMO detector 236, the receive processor 238, the transmit processor 220, the TX MIMO processor 230, one or more other components, or a combination thereof. In some examples, the processor 240 executes scrambling instructions 1304 to scramble (or descramble) the second codepoint 340 to determine the first codepoint 332.

In a first aspect, a method of wireless communication includes selecting, by a UE, a first codepoint from a codebook based on control information to be transmitted to a base station. The codebook is associated with non-coherent transmissions from the UE to the base station. The method further includes generating, based on the first codepoint and a scrambling sequence that is associated with the UE, a second codepoint representing the control information. The method further includes transmitting the second codepoint by the UE to the base station.

In a second aspect, alone or in combination with the first aspect, the control information includes an UCI payload, and the second codepoint is transmitted to the base station via a PUCCH.

In a third aspect, alone or in combination with one or more of the first through second aspects, the first codepoint includes a plurality of values associated with a particular OFDM symbol, and generating the second codepoint includes multiplying the plurality of values with a particular element of the scrambling sequence corresponding to the plurality of values.

In a fourth aspect, alone or in combination with one or more of the first through third aspects, the first codepoint is associated with a particular number of OFDM symbols, and a length of the scrambling sequence corresponds to the particular number.

In a fifth aspect, alone or in combination with one or more of the first through fourth aspects, the first codepoint includes a plurality of values associated with a particular base sequence parameter, and generating the second codepoint includes multiplying the plurality of values with a particular element of the scrambling sequence corresponding to the plurality of values.

In a sixth aspect, alone or in combination with one or more of the first through fifth aspects, the first codepoint is associated with a particular number of values of the base sequence parameter, and a length of the scrambling sequence corresponds to the particular number.

In a seventh aspect, alone or in combination with one or more of the first through sixth aspects, a length of the first codepoint is based on a first number of values of a DFT matrix and further based on a second number of values of a base sequence parameter, and a length of the scrambling sequence corresponds to the length of the first codepoint.

In an eighth aspect, alone or in combination with one or more of the first through seventh aspects, generating the second codepoint includes multiplying values of the first codepoint in both time and frequency domains.

In a ninth aspect, alone or in combination with one or more of the first through eighth aspects, the scrambling sequence indicates, for an OFDM symbol associated with the first codepoint, a first modified base sequence parameter.

In a tenth aspect, alone or in combination with one or more of the first through ninth aspects, the first modified base sequence parameter is randomly selected using a pseudorandom sequence generator from a pool of values, and the method further includes incrementing the first modified base sequence parameter, based on a modulus corresponding to a size of the pool of values, to determine a second modified base sequence parameter for the OFDM symbol.

In an eleventh aspect, alone or in combination with one or more of the first through tenth aspects, the pseudorandom sequence generator generates the first modified base sequence parameter based on one or more of an identifier of the UE, an indication of the OFDM symbol, or a slot index value.

In a twelfth aspect, alone or in combination with one or more of the first through eleventh aspects, the scrambling sequence is determined pseudo-randomly based on an identifier of the UE and further based on a slot index value.

In a thirteenth aspect, alone or in combination with one or more of the first through twelfth aspects, the second codepoint is transmitted without a DMRS.

In a fourteenth aspect, alone or in combination with one or more of the first through thirteenth aspects, transmission of the second codepoint reduces inter-cell interference between the UE and a second UE associated with a second base station as compared to use of the same first codepoint or a third codepoint having a correlation to the first codepoint that satisfies a correlation threshold.

In a fifteenth aspect, the method includes any combination of the first through fourteenth aspects.

In a sixteenth aspect, an apparatus includes a memory and one or more processors coupled to the memory. The one or more processors are configured to select, by a UE, a first codepoint from a codebook based on control information to be transmitted to a base station. The codebook is associated with non-coherent transmissions from the UE to the base station. The one or more processors are further configured to generate, by the UE and based on the first codepoint and a scrambling sequence that is associated with the UE, a second codepoint representing the control information. The one or more processors are further configured to transmit the second codepoint by the UE to the base station.

In a seventeenth aspect, an apparatus includes means for storing instructions. The apparatus further includes means for executing the instructions to select, by a UE, a first codepoint from a codebook based on control information to be transmitted to a base station, to generate, based on the first codepoint and a scrambling sequence that is associated with the UE, a second codepoint representing the control information, and to transmit the second codepoint by the UE to the base station. The codebook is associated with non-coherent transmissions from the UE to the base station.

In an eighteenth aspect, a non-transitory computer-readable medium stores instructions executable by a processor to initiate, perform, or control operations. The operations include selecting, by a UE, a first codepoint from a codebook based on control information to be transmitted to a base station. The codebook is associated with non-coherent transmissions from the UE to the base station. The operations further include generating, based on the first codepoint and a scrambling sequence that is associated with the UE, a second codepoint representing the control information. The operations further include transmitting the second codepoint by the UE to the base station.

In a nineteenth aspect, a method of wireless communication includes receiving, by a base station, a codebook associated with non-coherent transmissions. The codebook indicates at least a first codepoint. The method further includes receiving a second codepoint from a UE. The method further includes modifying the second codepoint based on a scrambling sequence that is associated with the UE to determine the first codepoint and, based on the first codepoint, determining control information associated with the UE.

In a twentieth aspect, alone or in combination with one or more of the nineteenth aspect, the control information includes an UCI payload, and the second codepoint is transmitted to the base station via a PUCCH.

In a twenty-first aspect, alone or in combination with one or more of the nineteenth through twentieth aspects, the second codepoint includes a plurality of values associated with a particular OFDM symbol, and modifying the second codepoint includes dividing the plurality of values with a particular element of the scrambling sequence corresponding to the plurality of values.

In a twenty-second aspect, alone or in combination with one or more of the nineteenth through twenty-first aspects, the first codepoint is associated with a particular number of OFDM symbols, and a length of the scrambling sequence corresponds to the particular number.

In a twenty-third aspect, alone or in combination with one or more of the nineteenth through twenty-second aspects, the second codepoint includes a plurality of values associated with a particular base sequence parameter, and modifying the second codepoint includes dividing the plurality of values with a particular element of the scrambling sequence corresponding to the plurality of values.

In a twenty-fourth aspect, alone or in combination with one or more of the nineteenth through twenty-third aspects, the first codepoint is associated with a particular number of values of the base sequence parameter, and a length of the scrambling sequence corresponds to the particular number.

In a twenty-fifth aspect, alone or in combination with one or more of the nineteenth through twenty-fourth aspects, a length of the first codepoint is based on a first number of values of a DFT matrix and further based on a second number of values of a base sequence parameter, and a length of the scrambling sequence corresponds to the length of the first codepoint.

In a twenty-sixth aspect, alone or in combination with one or more of the nineteenth through twenty-fifth aspects, modifying the first codepoint includes multiplying values of the first codepoint in both time and frequency domains.

In a twenty-seventh aspect, alone or in combination with one or more of the nineteenth through twenty-sixth aspects, the scrambling sequence indicates, for an OFDM symbol associated with the first codepoint, a first modified base sequence parameter.

In a twenty-eighth aspect, alone or in combination with one or more of the nineteenth through twenty-seventh aspects, the first modified base sequence parameter is randomly selected using a pseudorandom sequence generator from a pool of values, and the method further includes incrementing the first modified base sequence parameter, based on a modulus corresponding to a size of the pool of values, to determine a second modified base sequence parameter for the OFDM symbol.

In a twenty-ninth aspect, alone or in combination with one or more of the nineteenth through twenty-eighth aspects, the pseudorandom sequence generator generates the first modified base sequence parameter based on one or more of an identifier of the UE, an indication of the OFDM symbol, or a slot index value.

In a thirtieth aspect, alone or in combination with one or more of the nineteenth through twenty-ninth aspects, the scrambling sequence is determined pseudo-randomly based on an identifier of the UE and further based on a slot index value.

In a thirty-first aspect, alone or in combination with one or more of the nineteenth through thirtieth aspects, the second codepoint is transmitted without a DMRS.

In a thirty-second aspect, alone or in combination with one or more of the nineteenth through thirty-first aspects, transmission of the second codepoint reduces inter-cell interference between the UE and a second UE associated with a second base station as compared to use of the same first codepoint or a third codepoint having a correlation to the first codepoint that satisfies a correlation threshold.

In a thirty-third aspect, the method includes any combination of the nineteenth through thirty-second aspects.

In a thirty-fourth aspect, an apparatus includes a memory and one or more processors coupled to the memory. The one or more processors are configured to receive, at a base station, a codebook associated with non-coherent transmissions. The codebook indicates at least a first codepoint. The one or more processors are further configured to receive a second codepoint from a UE. The one or more processors are further configured to modify the second codepoint to determine the first codepoint based on a scrambling sequence that is associated with the UE. The one or more processors are further configured to determine control information associated with the UE based on the first codepoint.

In a thirty-fifth aspect, an apparatus includes means for storing instructions. The apparatus further includes means for executing the instructions to receive, at a base station, a codebook associated with non-coherent transmissions and that indicates at least a first codepoint, to receive a second codepoint from a UE, to modify the second codepoint based on a scrambling sequence that is associated with the UE to determine the first codepoint, and to determine control information associated with the UE based on the first codepoint.

In a thirty-sixth aspect, a non-transitory computer-readable medium stores instructions executable by a processor to initiate, perform, or control operations. The operations include receiving, by a base station, a codebook associated with non-coherent transmissions. The codebook indicates at least a first codepoint. The operations further include receiving a second codepoint from a UE and, based on a scrambling sequence that is associated with the UE, modifying the second codepoint to determine the first codepoint. The operations further include determining control information associated with the UE based on the first codepoint.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, one or more features described herein may be implemented via specialized processor circuitry, via executable instructions, or a combination thereof.

Those of skill would further appreciate that the various illustrative logical blocks, modules, circuits, and operations (e.g., the logical blocks in FIGS. 10 and 11) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
selecting, by a user equipment (UE), a first codepoint from a codebook based on control information to be transmitted to a base station, wherein the codebook is associated with non-coherent transmissions from the UE to the base station;
based on the first codepoint and a scrambling sequence that is associated with the UE, generating, by the UE, a second codepoint representing the control information, wherein the scrambling sequence is pseudo-randomly determined based on an identifier of the UE and a slot index value; and
transmitting the second codepoint by the UE to the base station.

2. The method of claim 1, wherein the control information includes an uplink control information (UCI) payload, and wherein the second codepoint is transmitted to the base station via a physical uplink control channel (PUCCH).

3. The method of claim 1, wherein the first codepoint includes a plurality of values associated with a particular orthogonal frequency division multiplexing (OFDM) symbol, and wherein generating the second codepoint includes multiplying the plurality of values with a particular element of the scrambling sequence corresponding to the plurality of values.

4. The method of claim 3, wherein the first codepoint is associated with a particular number of OFDM symbols, and wherein a length of the scrambling sequence corresponds to the particular number.

5. The method of claim 1, wherein the first codepoint includes a plurality of values associated with a particular base sequence parameter, and wherein generating the second codepoint includes multiplying the plurality of values with a particular element of the scrambling sequence corresponding to the plurality of values.

6. The method of claim 5, wherein the first codepoint is associated with a particular number of values of the base sequence parameter, and wherein a length of the scrambling sequence corresponds to the particular number.

7. The method of claim 1, wherein a length of the first codepoint is based on a first number of values of a discrete Fourier transform (DFT) matrix and further based on a second number of values of a base sequence parameter, and wherein a length of the scrambling sequence corresponds to the length of the first codepoint.

8. The method of claim 7, wherein generating the second codepoint includes multiplying values of the first codepoint in both time and frequency domains.

9. The method of claim 1, wherein the scrambling sequence indicates, for an orthogonal frequency division multiplexing (OFDM) symbol associated with the first codepoint, a first modified base sequence parameter.

10. The method of claim 9, wherein the first modified base sequence parameter is randomly selected using a pseudo-random sequence generator from a pool of values, and further including incrementing the first modified base sequence parameter, based on a modulus corresponding to a size of the pool of values, to determine a second modified base sequence parameter for the OFDM symbol.

11. The method of claim 10, wherein the pseudorandom sequence generator generates the first modified base sequence parameter based on one or more of the identifier of the UE, an indication of the OFDM symbol, or the slot index value.

12. The method of claim 1, wherein the second codepoint is transmitted without a demodulation reference signal (DMRS).

13. The method of claim 1, wherein transmission of the second codepoint reduces inter-cell interference between the UE and a second UE associated with a second base station as compared to use of the same first codepoint or a third codepoint having a correlation to the first codepoint that satisfies a correlation threshold.

14. An apparatus comprising:
a memory; and
one or more processors coupled to the memory and configured to:
select, by a user equipment (UE), a first codepoint from a codebook based on control information to be transmitted to a base station, wherein the codebook is associated with non-coherent transmissions from the UE to the base station;
based on the first codepoint and a scrambling sequence that is associated with the UE, generate, by the UE, a second codepoint representing the control information, wherein the scrambling sequence is pseudorandomly determined based on an identifier of the UE and a slot index value; and
transmit the second codepoint by the UE to the base station.

15. The apparatus of claim 14, wherein the control information includes an uplink control information (UCI) payload, and wherein the one or more processors are further configured to transmit the second codepoint to the base station via a physical uplink control channel (PUCCH).

16. The apparatus of claim 14, wherein the first codepoint includes a plurality of values associated with a particular orthogonal frequency division multiplexing (OFDM) symbol, and wherein the one or more processors are further configured to generate the second codepoint by multiplying the plurality of values with a particular element of the scrambling sequence corresponding to the plurality of values.

17. The apparatus of claim 16, wherein the first codepoint is associated with a particular number of OFDM symbols, and wherein a length of the scrambling sequence corresponds to the particular number.

18. The apparatus of claim 14, wherein the first codepoint includes a plurality of values associated with a particular base sequence parameter, and wherein the one or more processors are further configured to generate the second codepoint by multiplying the plurality of values with a particular element of the scrambling sequence corresponding to the plurality of values.

19. The apparatus of claim 18, wherein the first codepoint is associated with a particular number of values of the base sequence parameter, and wherein a length of the scrambling sequence corresponds to the particular number.

20. The apparatus of claim 14, wherein a length of the first codepoint is based on a first number of values of a discrete Fourier transform (DFT) matrix and further based on a second number of values of a base sequence parameter, and wherein a length of the scrambling sequence corresponds to the length of the first codepoint.

21. The apparatus of claim 20, wherein the one or more processors are further configured to generate the second codepoint by multiplying values of the first codepoint in both time and frequency domains.

22. The apparatus of claim 14, wherein the scrambling sequence indicates, for an orthogonal frequency division multiplexing (OFDM) symbol associated with the first codepoint, a first modified base sequence parameter.

23. The apparatus of claim 22, wherein the one or more processors are further configured to select the first modified base sequence parameter from a pool of values using a pseudorandom sequence generator and to increment the first modified base sequence parameter, based on a modulus corresponding to a size of the pool of values, to determine a second modified base sequence parameter for the OFDM symbol.

24. The apparatus of claim 23, wherein the pseudorandom sequence generator is configured to generate the first modified base sequence parameter based on one or more of the identifier of the UE, an indication of the OFDM symbol, or the slot index value.

25. The apparatus of claim 14, wherein the one or more processors are further configured to transmit the second codepoint without a demodulation reference signal (DMRS).

26. The apparatus of claim 14, wherein transmission of the second codepoint reduces inter-cell interference between the UE and a second UE associated with a second base station as compared to use of the same first codepoint or a third codepoint having a correlation to the first codepoint that satisfies a correlation threshold.

27. The apparatus of claim 14, wherein the one or more processors are further configured to transmit the second codepoint to the base station based on a determination that a signal-to-noise ratio (SNR) associated with communication between the UE and the base station fails to exceed a threshold, and wherein the SNR is determined by one or both of the UE or the base station.

28. The apparatus of claim 14, wherein the one or more processors are further configured to:
receive, from the base station, a configuration of a scrambling technique selected from among a plurality of scrambling techniques including a time domain and frequency domain scrambling technique, a time domain scrambling technique, a frequency domain scrambling technique, and a base sequence scrambling technique; and
generate the second codepoint further based on the configuration of the scrambling technique.

* * * * *